Feb. 17, 1959
A. M. STOTT
2,873,726
TENSION THRUSTER WITH BUFFER
Filed July 18, 1958
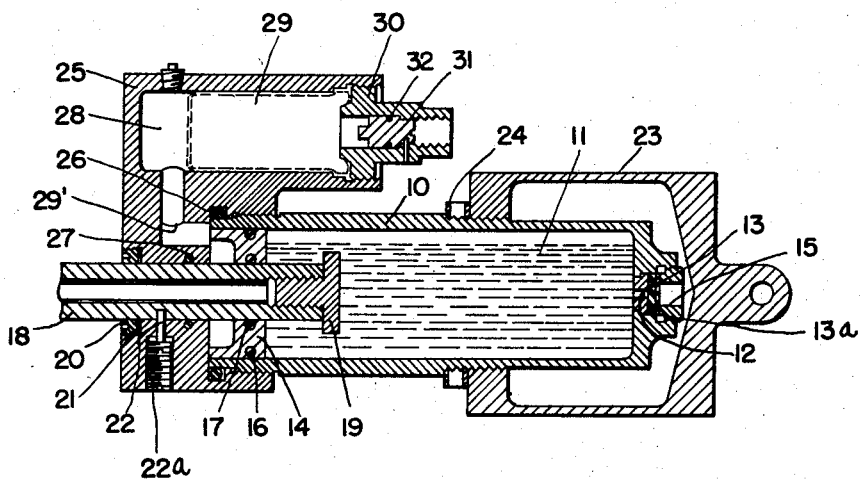
INVENTOR.
ALBERT M. STOTT
BY

2,873,726
TENSION THRUSTER WITH BUFFER

Albert M. Stott, Aldan-Clifton Heights, Pa.

Application July 18, 1958, Serial No. 749,567

5 Claims. (Cl. 123—24)

(Granted under Title 35, U. S. Code (1952), sec. 266)

The invention described herein may be manufactured and used by or for the Government for governmental purposes without the payment of any royalty thereon.

This invention relates to thruster mechanisms such as are actuated by a gas under pressure, mechanical, pneumatic or electrical means. It relates more especially to a thruster designed (1) to exert a tension or pulling force adapted to move a mass or load at a controlled velocity and (2) to operate uniformly over a wide range of temperatures.

An important function of this thruster is the production of a pulling force adapted to actuate a linkage by which the legs of an airman are positioned prior to his downward ejection from a disabled aircraft. In this situation, it is highly desirable that the exerted force be more tolerable than that produced by the thrusters heretofore available. In accordance with the present invention, such a force is produced by means including a floating piston which is arranged to act upon a buffer fluid such as oil and functions to activate its load only after the transients incident to its initial motion have subsided. A further distinguishing feature of this improved thruster is that the build-up of a high static pressure, which would produce a sealing problem, is prevented by the provision of an air pocket in the enclosure which contains the buffer liquid.

The invention will be better understood from the following description when considered in connection with the accompanying drawing and its scope is indicated by the appended claims.

The single figure of the drawing illustrates a thruster which includes a cylinder 10 containing a buffer liquid 11. The cylinder 10 has at one end an aperture 12 which is covered by a rupturable diaphragm 13 and a seal 13a and at its other end a floating piston 14. It should be understood that the cylinder 10, the rupturable diaphragm 13 and the floating piston 14, taken together, form an enclosure which contains a body of buffer liquid and a pocket of air. The pocket of air prevents build-up of pressure when oil expands due to rise in temperature.

The aperture disk and the diaphragm 13 are held in place by a threaded retainer 15. The piston 14 has an exterior seal 16 between it and the cylinder 10 and an interior seal 17 between it and a rod 18 which is coupled to the load (not shown) to be moved.

The rod 18 is encircled by a threaded nut 20 and a flat seal ring 21, and is fixed in place by a shear pin 22 and a locking screw 22a. Rod 18 extends through the piston 14, is hollow and has at its inner end a plug 19 arranged to be engaged by the piston 14 after it has traveled a distance which is dependent on the smoothing time required between actuation of the piston and the start of the rod movement.

At the apertured end of the cylinder 10 is a sleeve 23 which is the fixed element of the thruster, is threaded onto the cylinder 10 and locked thereto by a nut 24, and forms a container into which the buffer liquid is ejected when the diaphragm 13 is ruptured by the force exerted through the piston 14.

The other end of the cylinder 10 has threaded onto it a housing 25 which has an interior seal 27 between it and the rod 18. The housing 25 functions to provide an end closure for the cylinder 10 to provide a combustion chamber 28 which is connected to the interior of the cylinder through a duct 29'.

The chamber 28 is adapted to enclose an explosive cartridge 29 and has threaded into its end a guide 30 for a firing pin 31 which is surrounded by a seal 32 and may be actuated by a gas pressure or otherwise as desired.

In the operation of the above described mechanism, the gas generated by the firing of the cartridge 29 moves the piston 14 which compresses the buffer oil 11 so that the diaphragm 13 is ruptured and oil is ejected into the sleeve 23.

Further movement of the piston 14 causes a shouldering action with the plug 19 and the tension developed in the rod 18 causes the pin 22 to shear. The rod then exerts a tension force adapted to move a load such as a linkage arranged to position the legs of an airman prior to his downward ejection from a disabled aircraft or the like.

Although the delay between actuation of the piston 14 and the start of the movement of the rod 18 is kept at a minimum in the illustrated embodiment of the invention, it is apparent that this delay may be readily varied by changing the stand-off distance between the piston 14 and the plug 19.

I claim:

1. The combination of means forming an enclosure with a floating piston at one end and an aperture covered by a rupturable diaphragm at the other end, a buffer liquid partially filling said enclosure, a load moving member arranged to be coupled to said piston at a predetermined point in its travel, and means for applying to said piston a pressure whereby said diaphragm is ruptured and said liquid is ejected through said aperture.

2. The combination of means forming an enclosure with a floating piston at one end and an aperture covered by a rupturable diaphragm at the other end, a buffer liquid partially filling said enclosure, a load moving member arranged to be coupled to said piston at a predetermined point in its travel, means forming a container, and means for applying to said piston a pressure whereby said diaphragm is ruptured and said liquid is transferred from said enclosure through said aperture into said container.

3. The combination of means forming an enclosure with a floating piston at one end and an aperture covered by a rupturable diaphragm at the other end, a buffer liquid partially filling said enclosure, a rod extending through and arranged to be coupled to said piston at a predetermined point in its travel, and means for applying to said piston a pressure whereby said diaphragm is ruptured and said liquid is ejected through said aperture.

4. The combination of means forming an enclosure with a floating piston at one end and an aperture covered by a rupturable diaphragm at the other end, a buffer liquid partially filling said enclosure, a rod extending through and arranged to be coupled to said piston at a predetermined point in its travel, means forming an annular container about the end of said enclosure, and means for applying to said piston a pressure whereby said diaphragm is ruptured and said liquids ejected through said aperture into said container.

5. The combination of means forming an enclosure with a floating piston at one end and an aperture covered by a rupturable diaphragm at the other end, a buffer liquid partially filling said enclosure, a load moving member held in place by a shear pin and arranged to be coupled to said piston at a predetermined point in its travel, and means including an explosive cartridge arranged to apply to said piston a pressure whereby said pin is sheared, said diaphragm is ruptured and said liquid is ejected from said enclosure.

No references cited.